United States Patent
Zemlok et al.

(10) Patent No.: US 12,514,656 B2
(45) Date of Patent: Jan. 6, 2026

(54) SURGICAL ROBOTIC SYSTEMS

(71) Applicant: Covidien LP, Mansfield, MA (US)

(72) Inventors: Michael A. Zemlok, Prospect, CT (US); Alexander Nothhelfer, Munich (DE); Richard S. Lech, Hamden, CT (US); Ranjan K. Mishra, Orange, CT (US); Ulrich Hagn, Munich (DE)

(73) Assignee: Covidien LP, Mansfield, MA (US)

( * ) Notice: Subject to any disclaimer, the term of this patent is extended or adjusted under 35 U.S.C. 154(b) by 596 days.

(21) Appl. No.: 17/736,331

(22) Filed: May 4, 2022

(65) Prior Publication Data

US 2022/0378522 A1 Dec. 1, 2022

Related U.S. Application Data

(60) Provisional application No. 63/193,664, filed on May 27, 2021.

(51) Int. Cl.
*A61B 17/00* (2006.01)
*A61B 34/30* (2016.01)
*G01L 1/12* (2006.01)
*G01L 25/00* (2006.01)
(Continued)

(52) U.S. Cl.
CPC .............. *A61B 34/30* (2016.02); *G01L 1/125* (2013.01); *G01L 25/003* (2013.01); *A61B 2017/00477* (2013.01); *A61B 2034/306* (2016.02); *A61B 34/70* (2016.02); *A61B 2090/064* (2016.02);
(Continued)

(58) Field of Classification Search
CPC .................... A61B 34/30; A61B 34/70; A61B 2017/00477; A61B 2034/306; A61B 2090/064; A61B 2090/066; A61B 2560/0223; A61B 2560/0462; A61B 2562/0223; A61B 2562/18; A61B 34/77; A61B 2034/305; G01L 1/125; G01L 25/003

USPC ............ 173/1–2, 5, 13, 18–20, 184, 25–31, 173/38–39, 45–53; 227/175.1–182.1, 8, 227/19

See application file for complete search history.

(56) References Cited

U.S. PATENT DOCUMENTS 2,835,472 A * 5/1958 Osborn ................... E21B 7/046
175/218
3,141,360 A * 7/1964 Wolf .................... B25H 1/0078
408/110
(Continued)

FOREIGN PATENT DOCUMENTS

CA     2826925 A1 * 8/2006  ............. A61B 34/76
EP     3566671 A1 * 11/2019 ............. A61B 34/30
(Continued)

OTHER PUBLICATIONS www.nsk.com/company/news/2020/0707a.html, NSK Develops First Non-Contact Torque Sensor for Drive Shafts in Motor Vehicles, last visited Aug. 1, 2022.
(Continued)

*Primary Examiner* — Robert F Long
(74) *Attorney, Agent, or Firm* — Carter, DeLuca & Farrell LLP

(57) ABSTRACT

A surgical robotic system includes a plurality of magneto sensors for measuring a torque, axial force, angle, position, or speed of various driven members in the surgical robotic system.

14 Claims, 7 Drawing Sheets

(51) Int. Cl.
*A61B 34/00* (2016.01)
*A61B 90/00* (2016.01)

(52) U.S. Cl.
CPC . *A61B 2090/066* (2016.02); *A61B 2560/0223* (2013.01); *A61B 2560/0462* (2013.01)

(56) References Cited

U.S. PATENT DOCUMENTS

| | | | | |
|---|---|---|---|---|
| 3,173,315 | A * | 3/1965 | Fuldner | G05B 19/373 91/170 R |
| 3,464,655 | A * | 9/1969 | Schuman | B28D 1/041 74/89.17 |
| 3,827,822 | A * | 8/1974 | Converse | B25H 1/0078 408/110 |
| 3,890,058 | A * | 6/1975 | Self | B25H 1/0078 408/112 |
| 4,234,155 | A * | 11/1980 | Destree | F16M 11/24 173/190 |
| 4,375,931 | A * | 3/1983 | Erdt | B25H 1/0064 408/129 |
| 4,441,564 | A * | 4/1984 | Castillo | E21B 7/02 175/122 |
| 4,468,159 | A * | 8/1984 | Oster | B23Q 11/1007 125/20 |
| 4,541,759 | A * | 9/1985 | Miyoshi | B25H 1/0071 408/712 |
| 4,553,612 | A * | 11/1985 | Durham | E21B 7/201 175/203 |
| 4,873,874 | A | 10/1989 | Sobel | |
| 4,933,580 | A * | 6/1990 | Ishino | H10N 35/101 73/DIG. 2 |
| 5,006,022 | A * | 4/1991 | Miller | B25H 1/0042 408/110 |
| 5,147,162 | A * | 9/1992 | Capotosto | B25H 1/0078 408/110 |
| 5,558,476 | A * | 9/1996 | Uchida | B25H 1/0064 408/11 |
| 6,330,833 | B1 | 12/2001 | Opie et al. | |
| 6,692,201 | B2 * | 2/2004 | Soderman | B25H 1/0064 408/712 |
| 6,698,299 | B2 | 3/2004 | Cripe | |
| 8,453,853 | B1 * | 6/2013 | Adams | A63C 17/0006 211/180 |
| 8,828,023 | B2 | 9/2014 | Neff et al. | |
| 10,704,653 | B2 * | 7/2020 | Almqvist | F16H 3/089 |
| 11,982,184 | B2 * | 5/2024 | Schmitz | E21B 7/027 |
| 2001/0029792 | A1 | 10/2001 | Garshelis | |
| 2004/0253064 | A1* | 12/2004 | Koslowski | B28D 1/041 408/1 R |
| 2009/0000627 | A1* | 1/2009 | Quaid | A61N 1/3605 128/898 |
| 2009/0308628 | A1* | 12/2009 | Totsu | B25B 23/14 173/217 |
| 2011/0089872 | A1* | 4/2011 | Vanderelli | H02K 1/2796 318/400.3 |
| 2011/0214894 | A1* | 9/2011 | Harada | B25B 21/02 173/2 |
| 2012/0107064 | A1* | 5/2012 | Chen | B23C 1/08 409/203 |
| 2013/0264915 | A1* | 10/2013 | Suzuki | H02K 11/215 310/68 B |
| 2014/0076913 | A1* | 3/2014 | Neumeier | B23P 19/003 221/133 |
| 2015/0158550 | A1* | 6/2015 | Kawakami | B62M 6/55 180/206.4 |
| 2015/0173840 | A1* | 6/2015 | Lohmeier | A61B 17/00 606/130 |
| 2016/0138299 | A1* | 5/2016 | Powers, III | E01F 15/0484 173/184 |
| 2017/0202605 | A1* | 7/2017 | Shelton, IV | A61B 18/1445 |
| 2017/0368672 | A1* | 12/2017 | Meyer | B25C 1/06 |
| 2018/0021097 | A1* | 1/2018 | Quaid | A61B 34/10 600/407 |
| 2018/0231425 | A1 | 8/2018 | Raths Ponce et al. | |
| 2018/0326507 | A1* | 11/2018 | Halvorsen | B25H 1/0035 |
| 2019/0000567 | A1* | 1/2019 | Allen | A61B 34/30 |
| 2019/0038368 | A1* | 2/2019 | Seow | A61B 50/20 |
| 2019/0110850 | A1 | 4/2019 | Hares et al. | |
| 2019/0158007 | A1* | 5/2019 | Mori | H02P 21/18 |
| 2019/0183503 | A1* | 6/2019 | Shelton, IV | A61B 90/06 |
| 2019/0201120 | A1* | 7/2019 | Shelton, IV | A61B 34/70 |
| 2021/0052337 | A1* | 2/2021 | Kapadia | A61B 34/37 |
| 2021/0113282 | A1* | 4/2021 | Kapadia | B25J 15/0213 |
| 2021/0212684 | A1* | 7/2021 | Satti, III | A61B 17/0682 |
| 2021/0265905 | A1* | 8/2021 | Jungmayr | H02K 5/1732 |
| 2021/0372201 | A1* | 12/2021 | Pollock | E21B 7/02 |
| 2022/0031407 | A1 | 2/2022 | Kapadia et al. | |
| 2022/0096084 | A1* | 3/2022 | Beckman | A61B 34/76 |
| 2022/0168056 | A1* | 6/2022 | Seow | A61B 17/29 |
| 2022/0240930 | A1* | 8/2022 | Yates | A61B 90/98 |
| 2022/0378522 | A1* | 12/2022 | Zemlok | G01L 1/125 |
| 2022/0409302 | A1* | 12/2022 | Shelton, IV | B25J 9/1694 |
| 2023/0022559 | A1* | 1/2023 | King | E21B 15/04 |
| 2023/0035946 | A1* | 2/2023 | Kapadia | A61B 34/37 |
| 2023/0233277 | A1* | 7/2023 | Mishra | A61B 34/30 606/1 |
| 2023/0393677 | A1* | 12/2023 | Kim | G01L 5/0042 |
| 2024/0042609 | A1* | 2/2024 | Fogarty | B25J 9/1664 |

FOREIGN PATENT DOCUMENTS

| | | | | |
|---|---|---|---|---|
| WO | WO-2020023255 | A1 * | 1/2020 | A61B 34/30 |
| WO | WO-2020060794 | A1 * | 3/2020 | A61B 34/30 |
| WO | WO-2023144725 | A1 * | 8/2023 | A61B 34/30 |
| WO | WO-2024194721 | A1 * | 9/2024 | |

OTHER PUBLICATIONS ncte.com/en/technology, NCTE Technology, last visited Aug. 4, 2022.
magnetic-sense.com/en/torquesensor, The non-contact torque sensor from Trafeg, Magnetic-Inductive Torque Sensor, last visited Aug. 1, 2022.
www.tam-sensors.com/active-3-lite, Active-3 Lite, last visited Aug. 1, 2022.
Extended European Search Report dated Oct. 19, 2022 corresponding to counterpart Patent Application EP 22175650.5.
Communication Pursuant to Article 94(3) EPC issued in corresponding European Application No. 22 175 650.5 dated Nov. 12, 2025, 10 pages.

* cited by examiner

SURGICAL ROBOTIC SYSTEMS

CROSS-REFERENCE TO RELATED APPLICATION

This application claims the benefit of and priority to U.S. Provisional Patent Application No. 63/193,664, filed May 27, 2021, the entire contents of which is incorporated by reference herein.

FIELD

The present technology is generally related to surgical robotic systems used in minimally invasive medical procedures.

BACKGROUND

Some surgical robotic systems included a console supporting a surgical robotic arm and a surgical instrument or at least one end effector (e.g., forceps or a grasping tool) mounted to the robotic arm. The robotic arm provided mechanical power to the surgical instrument for its operation and movement. Each robotic arm may include an instrument drive unit operatively connected to the surgical instrument.

The instrument drive unit was typically coupled to the robotic arm via a rail. The rail allowed the instrument drive unit and the attached surgical instrument to move along an axis of the rail, providing a means for adjusting the axial position of the end effector of the surgical instrument.

SUMMARY

In one aspect of the disclosure, a surgical robotic arm for use in a minimally invasive surgical procedure is provided and includes a plurality of elongate members movably coupled to one another, an elongated rail pivotably coupled to one of the elongate members, and a magneto sensor coupled to the elongate member or the elongated rail. The rail has a proximal end portion, a distal end portion, and a track defined between the proximal and distal end portions. The rail is configured for slidable engagement of a surgical instrument thereto. The magneto sensor is configured to sense a torque of the one of the plurality of elongate members or the elongated rail.

In aspects, the magneto sensor may be a magnetostrictive sensor, a magnetoelastic sensor, or a magnetoresistive sensor.

In aspects, the elongate members include first, second, and third elongate members each having a first end and a second end. The first end of the second elongate member may be rotatably connected to the second end of the first elongate member and the first end of the third elongate member may be rotatably connected to the second end of the second elongate member. The distal end portion of the rail may be rotatably coupled to the second end of the third elongate member.

In aspects, the magneto sensor may be coupled to the second end of the first elongate member and may be configured to sense the torque of the second elongate member.

In accordance with another aspect of the disclosure, a surgical robotic system is provided and includes an elongated rail and an instrument drive unit. The rail has a proximal end portion, a distal end portion, and a track defined between the proximal and distal end portions. The instrument drive unit is configured for slidable engagement with the track of the rail and includes a motor, a drive shaft drivingly coupled to the motor and configured to move in response to an activation of the motor, and a magneto sensor disposed adjacent the drive shaft. The magneto sensor is configured to determine a force experienced by the drive shaft.

In aspects, the drive shaft may be magnetized, and the magneto sensor may partially or completely surround the drive shaft.

In aspects, the drive shaft may be configured to rotate in response to the activation of the motor. The force determined by the magneto sensor may be a torque of the drive shaft.

In aspects, the drive shaft may be configured to translate in response to the activation of the motor. The force determined by the magneto sensor may be an axial force experienced by the drive shaft.

In aspects, the surgical robotic system may include a surgical instrument, which includes a housing portion configured to detachably connect to the instrument drive unit, an elongate shaft extending distally from the housing portion, and an end effector coupled to a distal end portion of the elongate shaft. The drive shaft of the instrument drive unit may be configured to drive an operation of the end effector of the end effector.

In aspects, the surgical robotic system may further include a dielectric sheet disposed around the drive shaft and between an outer surface of the drive shaft and the magnetoelastic sensor.

In aspects, the surgical robotic system may further include an amplification control circuit in communication with the magnetoelastic sensor.

In accordance with further aspects of the disclosure, an instrument drive unit for driving an operation of a surgical instrument is provided. The instrument drive unit includes a motor, a drive shaft drivingly coupled to the motor and configured to move in response to an activation of the motor, and a magneto sensor disposed adjacent the drive shaft. The magneto sensor is configured to determine a force experienced by the drive shaft.

Further details and aspects of exemplary embodiments of the disclosure are described in more detail below with reference to the appended figures.

BRIEF DESCRIPTION OF THE DRAWINGS

Embodiments of the disclosure are described herein with reference to the accompanying drawings, wherein.

DETAILED DESCRIPTION

Figure 1:
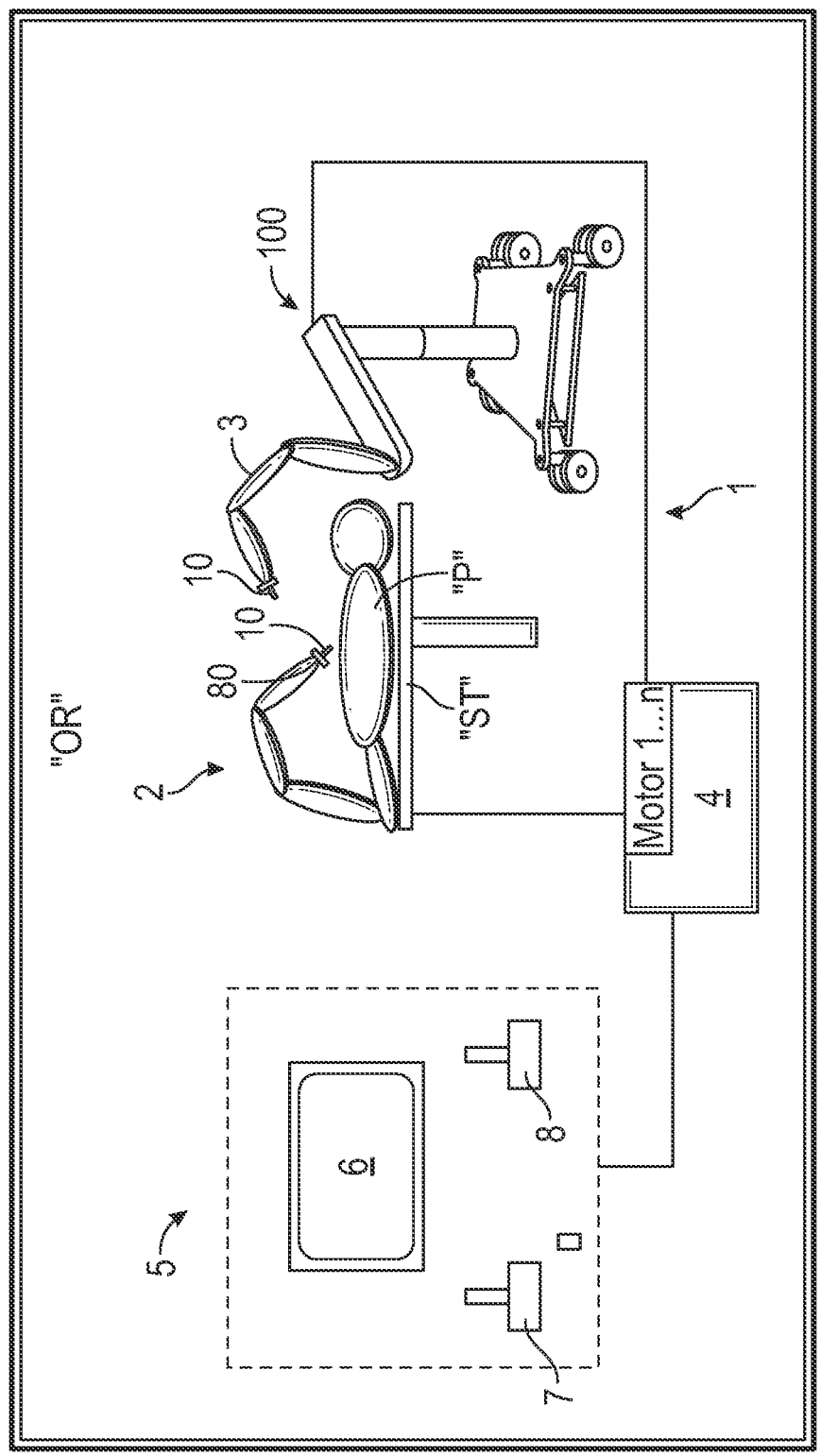
FIG. 1 is a schematic illustration of a surgical robotic system including a surgical robotic arm and an instrument drive unit in accordance with the disclosure.

Embodiments of the disclosed surgical robotic system are described in detail with reference to the drawings, in which like reference numerals designate identical or corresponding elements in each of the several views. As used herein the term "distal" refers to that portion of the surgical robotic system or component thereof, that is closer to a patient, while the term "proximal" refers to that portion of the surgical robotic system or component thereof, that is further from the patient.

As will be described in detail below, provided is a surgical robotic system incorporating a magneto sensor (e.g., magnetostrictive sensors, magnetoelastic sensors, and magnetoresistive sensors) used to control and/or monitor the actuators, drives, joints and/or arm links of the surgical robotic system in addition to any surgical instrument or device coupled to the surgical robotic system that requires force and torque sensing.

This application may include, but is not limited to, integrating the sensors onto one or more shafts or actuators in a single mechanized drivetrain or electro-mechanical assembly. By sensing the torsion or loads at multiple points within one mechanized drive, on multiple shafts and/or actuators, in one electro-mechanical drive (which can include, but is not limited to: gears, linear drives, screw drives, rack & pinion drives, pulley drives or any torque or speed altering mechanism), the torque or force measurements can be used to monitor efficiencies for any specific section of the drive to determine if the efficiencies at any portion of this drive are changing due to motor conditions, overload, lubrication changes, cooling or thermal effects, degradation, fatigue, damage, plastic/elastic component deformation. By understanding these efficiency changes in any of these portions of the drives, it can be used for controls to change any combination of: cooling methods at any stage of the electro-mechanical drive which, can include, but is not limited to, fan flow/speed rates, lubrication and fluid management and flow, motor controls to limit any combination of speed and torque, through any combination of voltage or current, or through control changes with any electro-mechanical clutch or brake mechanism.

The sensors can also be used to determine if the specific drive, subsystem or system will require control limitations to prevent failures and/or drive damage and to enter into a functional "safe" or shut down mode. The "safe" mode can include, but is not limited to, reduced speeds and/or drive torques and/or backout or removal operational functions only prior to any form of partial or full system shut down. The monitoring at these stages can also be used to predict and communicate any combination of: drive or component life status and/or replacement, service life or predicted need of specific service for any section of the drive, lubrication changes, cooling deficiencies, air and/or oil filter changes.

A magnetostrictive sensor takes advantage of magnetostriction, which is a property of ferromagnetic materials such as iron, nickel, cobalt and their alloys to expand or contract when placed in magnetic field. Initially, when these ferromagnetic materials are not magnetized, the magnetic domains of the ferromagnetic material are randomly distributed. However, when they are placed in a magnetic field, the magnetic domains undergo changes and are arranged in parallel. A magnetostrictive sensor is used to measure linear position. The magnetostrictive sensors measures the position of the permanent magnet (the position magnet) to determine the distance between the permanent magnet and the sensor head. The main components of the magnetostrictive sensor include a waveguide, a position magnet, electronics, a strain pulse detection system, and a damping module.

A magnetoelastic sensor includes a ferromagnetic ring attached to a stressed component being measured, such as, for example, a gear, bearing, lead screw, linear drive, shaft, actuator, motor shaft, drive component or servo-drive component. Alternatively, if the stressed component is ferromagnetic, a section of the shaft may be permanently magnetized to produce a circumferential magnetic field, eliminating the need for an external ring. When torque or force (stress) are applied, the magnetic moments inside the shaft (or ring) are reoriented, causing a magnetic flux to develop around the outer circumference of the shaft. The strength of the magnetic field flux is linearly proportional to the stress—and therefore, the torque or force—on the shaft, and the polarity of the magnetic field indicates the direction of torque. Magnetic field sensors positioned around the shaft determine the amount and direction of torque based on this flux. These sensors can also be used to measure linear position, speed, or angle.

Magnetoresistive sensors are based the change of the resistivity of a current carrying ferromagnetic material due to a magnetic field ("magnetoresistive effect").

The magneto sensors may be used alone or in conjunction with other tensile and/or compressive load sensors present in the rail or z-slide of the surgical assembly, robotic arm links, robotic arm cart fixation points or couplings, and/or in a stapler or other suitable linear drive actuated instruments or devices such as stapler adapters and straight instruments. The magneto sensors may also supplement or replace any torsional sensors in the robotic arm joints, setup arm joints, and any suitable surgical instrument or instrument drive unit.

Some advantages of using the magneto sensors include: providing a low profile, non-mechanical contact force or torsion sensing; high reliability—no friction occurs between the sensor and the shaft to reduce or prevent wear, fatigue, or degradation; high efficiency—no frictional drag on the torsional or linear drive; electrical isolation—the magneto sensors are isolated from the output shaft and will protect the sensor from undesirable electro-surgical energy sources, electrical noise, or ground path concerns; mechanical overload—the magneto sensors are not mechanically connected to the torsional, compression, or tensile loads of the drive shaft of an actuator and the magneto sensors may be tuned for high precision with no damaging overload concerns; unlimited range—the magneto sensors do not require hard stops or positional controls to limit linear or rotational range; and the magneto sensors are less effected by direction transition states, gravitational affects, accelerations and degradation due to wear than traditional strain gauge sensor technologies.

Referring initially to FIG. 1, a surgical system, such as, for example, a surgical robotic system 1, generally includes a plurality of surgical robotic arms 2, 3 having an instrument drive unit 80 and an electromechanical instrument 10 removably attached thereto; a surgical cart 100 for supporting the surgical robotic arms 2 or 3; a control device 4; and an operating console 5 coupled with control device 4.

Operating console 5 includes a display device 6, which is set up in particular to display three-dimensional images; and manual input devices 7, 8, by means of which a person (not shown), for example a surgeon, is able to telemanipulate robotic arms 2, 3 in a first operating mode, as known in principle to a person skilled in the art. Each of the robotic arms 2, 3 may be composed of a plurality of members, which are connected through joints, as will be described in greater detail below. Robotic arms 2, 3 may be driven by electric drives (not shown) that are connected to control device 4. Control device 4 (e.g., a computer) is set up to activate the drives, in particular by means of a computer program, in such a way that robotic arms 2, 3, the attached instrument drive units 80, and thus electromechanical instrument 10 execute a desired movement according to a movement defined by means of manual input devices 7, 8. Control device 4 may also be set up in such a way that it regulates the movement of robotic arms 2, 3 and/or of the drives.

Surgical robotic system 1 is configured for use on a patient "P" lying on a surgical table "ST" to be treated in a minimally invasive manner by means of a surgical instrument, e.g., electromechanical instrument 10. Surgical robotic system 1 may also include more than two robotic arms 2, 3, the additional robotic arms likewise being connected to control device 4 and being telemanipulatable by means of operating console 5. A surgical instrument, for example, electromechanical surgical instrument 10, may also be attached to the additional robotic arm.

Control device 4 may control a plurality of motors, e.g., motors (Motor 1 . . . n), with each motor configured to drive movement of robotic arms 2, 3 in a plurality of directions.

Further, control device 4 may control a motor, such as, for example, a hollow core motor, configured to drive a relative rotation of elongate members of surgical robotic arm 2. The hollow core motor may be configured to rotate a drive shaft 102 (FIG. 5) for operating a function of the attached surgical instrument 10.

In aspects, the instrument drive unit 80 or and/or the surgical instrument 10 may include a drive train having a plurality of interconnected shafts and/or gears for transferring forces therealong. It is contemplated that torque measurement may occur at multiple locations along the drive trains (e.g., to identify gear friction). The sensors of the disclosure may be integrated internal to and/or external to any of the motor assemblies.

For a detailed description of the construction and operation of a surgical robotic system, reference may be made to U.S. Pat. No. 8,828,023, entitled "Medical Workstation," the entire contents of which are incorporated by reference herein.

Figure 2:
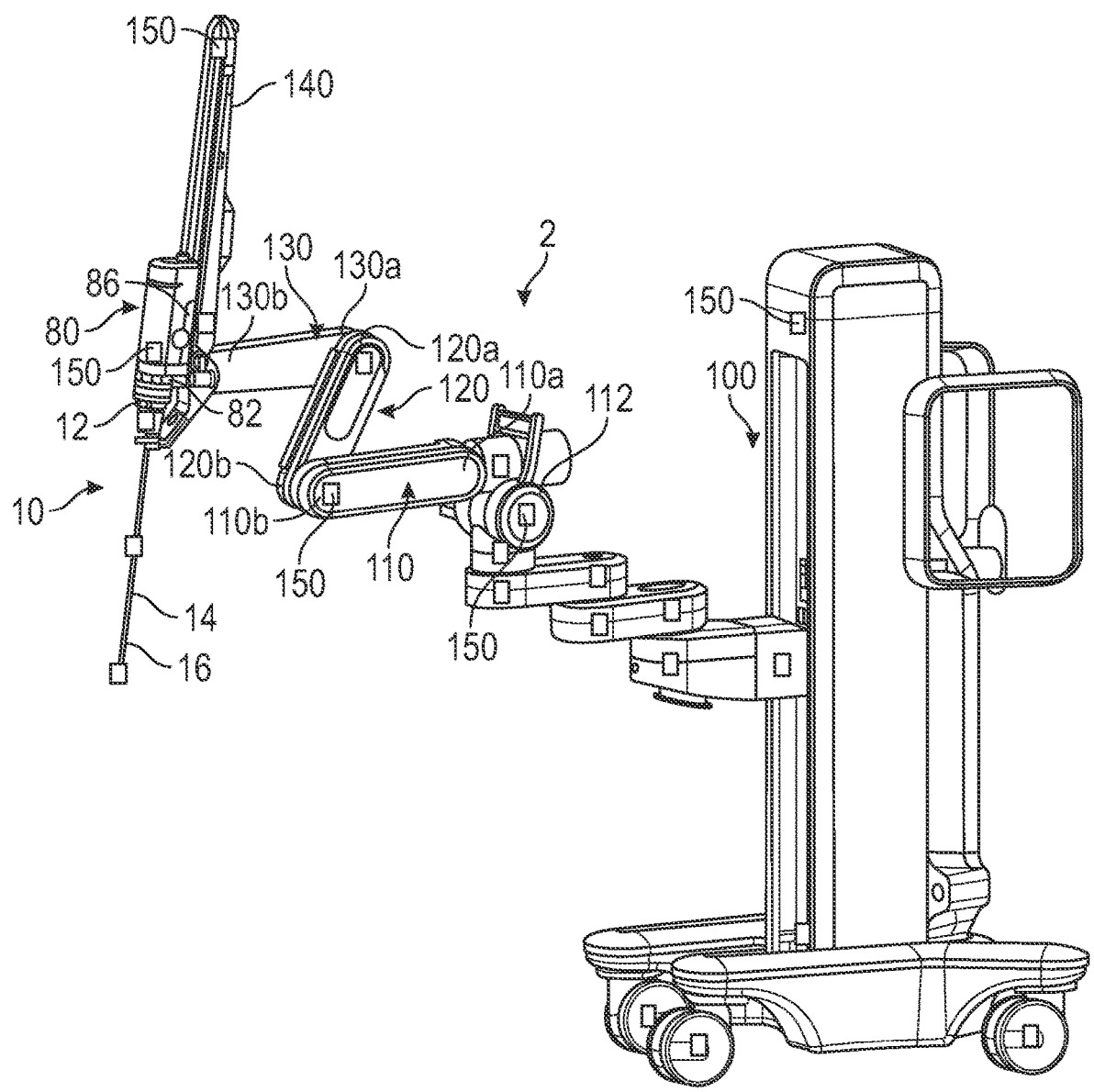
FIG. 2 is a side, perspective view of the surgical robotic arm of FIG. 1 coupled to a surgical instrument, the instrument drive unit, and a surgical cart.

With reference to FIG. 2, the surgical instrument 10 has a housing portion 12, an elongated shaft 14 extending distally from the housing portion 12, and an end effector 16 supported on a distal end portion of the elongated shaft 14. The housing portion 12 has a proximal coupling mechanism configured for slidable engagement in a correspondingly configured sterile interface module 82, which couples the surgical instrument 10 to a distal end portion of the instrument drive unit 80. In aspects, the housing portion 12 of the surgical instrument 10 may be detachably, drivingly coupled to the instrument drive unit 80 via other suitable fastening mechanisms, such as a snap-fit engagement, an interference fit, a threaded engagement, etc.

The surgical robotic arm 2 includes a plurality of elongate members or links 110, 120, 130 pivotably connected to one another to provide varying degrees of freedom to the robotic arm 2. In particular, the robotic arm 2 includes a first elongate member 110, a second elongate member 120, a third elongate member 130, and a fourth elongate member or rail 140. The first elongate member 110 has a first end 110a and a second end 110b. The first end 110a is rotatably coupled to a connector 112. The connector 112 is rotatably coupled to a fixed surface or base 100, for example, a surgical cart, a surgical table, stanchion, gantry, operating room wall or ceiling, or other surface present in the operating room.

The first end 110a of the first elongate member 110 is rotatable relative to the connector 112 about a longitudinal axis, and the connector 112 is swivelable (or pivotable, rotatable, or articulatable) relative to the base 100 about a swivel axis that is perpendicular relative to the longitudinal axis of the connector 112. The second end 110b of the first elongate member 110 is coupled to a first end 120a of the second elongate member 120 and configured to rotate relative to the first elongate member 110 about a pivot axis defined through the second end 110b of the first elongate member 110 and the first end 120a of the second elongate member 120. The third elongate member 130 includes a first end 130a rotatably coupled to the second end 120b of the second elongate member 120, and a second end 130b.

It is contemplated that the robotic arm 2 has a plurality of motors 157 (FIG. 3B), such as, for example, hollow core or pancake motors disposed at each of the joints "J" (FIGS. 3A and 3B) for driving the relative rotation of the elongate members 110, 120, 130. A motor 157 may also be provided in the connector 112 for driving a rotation of the first elongate member 110 relative to the connector 112, and a motor (not shown) may be provided in the surgical cart 100 for driving the swivel motion of the connector 112, along with the attached robotic arm 2, relative to the surgical cart 100.

The rail 140 of the robotic arm 2 has a first end portion or distal end portion rotatably coupled to the second end 130b of the third elongate member 130, a second end portion or proximal end portion, and a track defined between the first and second end portions. The track of the rail 140 is configured for slidable attachment of the instrument drive unit 80, such that the surgical instrument 10 and instrument drive unit 80 are configured to slide as one unit along a longitudinal axis defined by the track rail 140. The instrument drive unit 80 may be slidably coupled to the track rail 140 via a carriage 86 that slides along the rail 140 upon a selective actuation by motor(s) (not shown) supported on the rail 140 or motors (1 . . . n) of the control device 4 (FIG. 1). As such, the surgical instrument 10 can be moved to a selected position along the rail 140 when attached to the instrument drive unit 80.

Figure 3A:
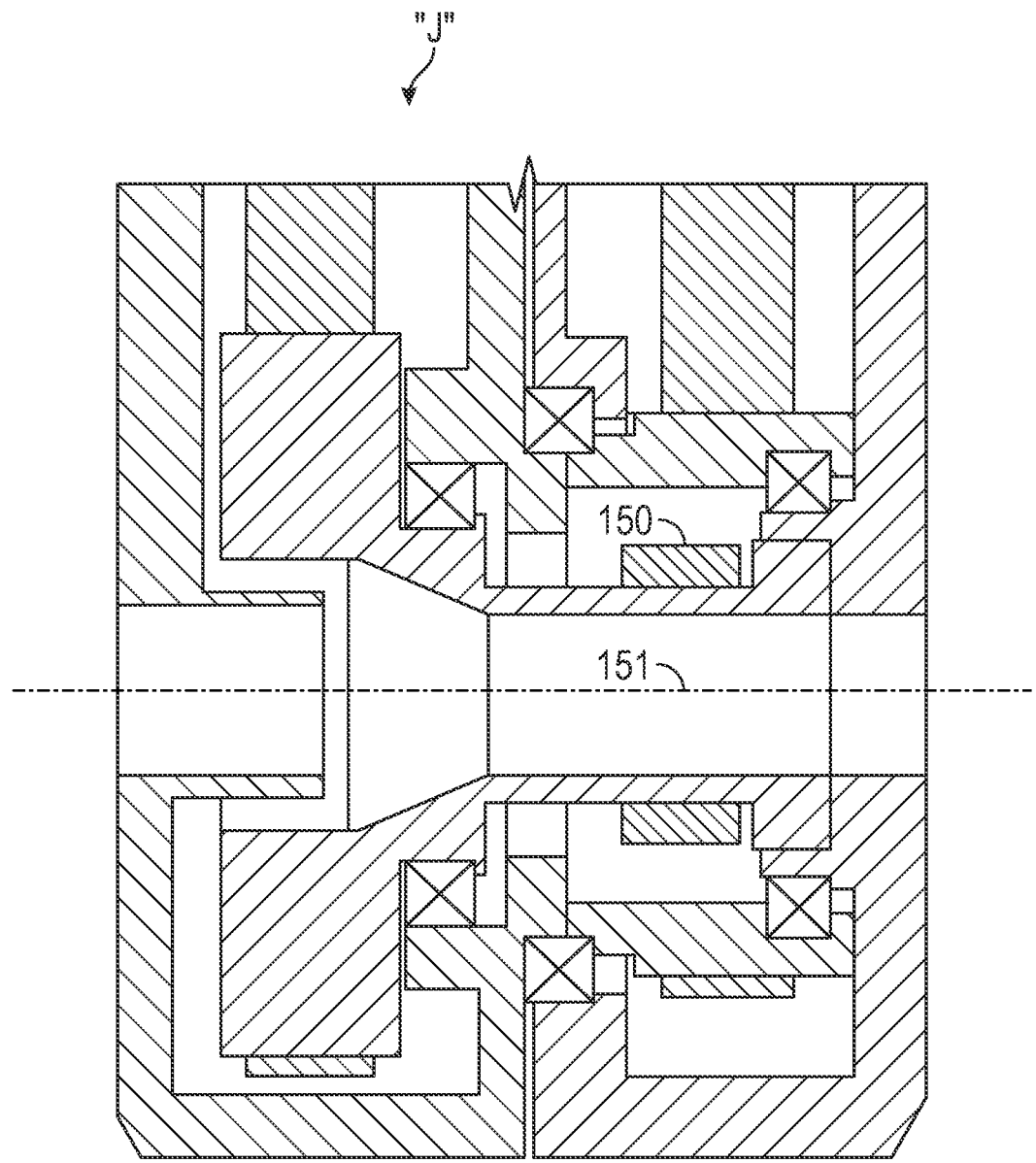
FIG. 3A is a cross-sectional view illustrating a joint of a plurality of joints of the robotic arm of FIG. 1.
Figure 3B:
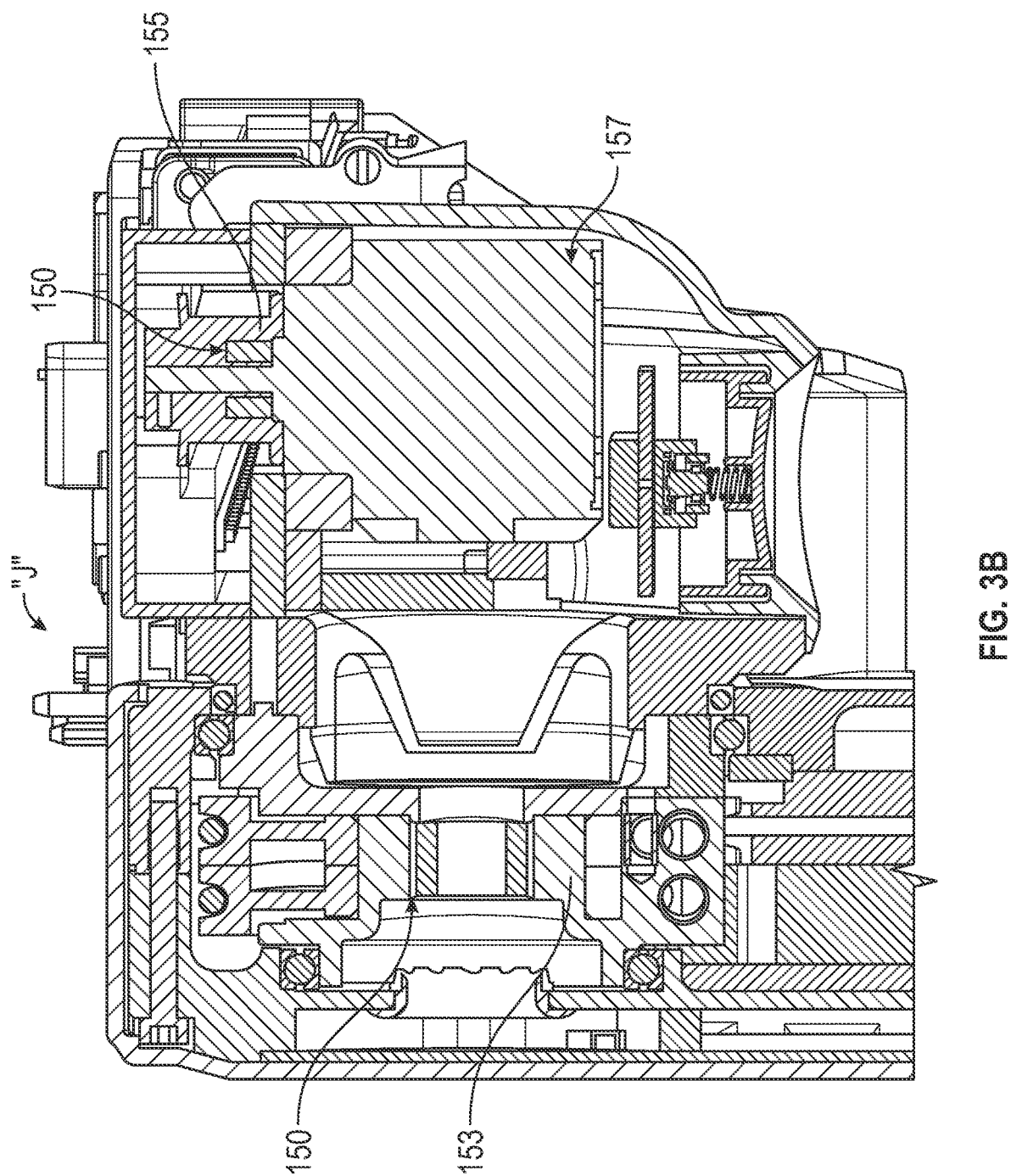
FIG. 3B is another cross-sectional view illustrating the joint.

With reference to FIGS. 2, 3A, and 3B, any movable component of the surgical robotic system 1 may include a magneto sensor 150 for sensing the load and/or torque being experienced by the movable component. More specifically, the magneto sensor 150 is one of a magnetostrictive sensor, magnetoelastic sensor, or magnetoresistive sensor and are non-contact sensors that reliably and accurately measure torque, compressive load, tensile load, position, angle, speed, or the like in the movable components. The movable components of the surgical robotic system 1 that incorporate the magneto sensors 150 may be, for example, the elongate links 110, 120, 130, for accurately measuring the position, torque, or other forces experienced by the elongate links 110, 120, 130 during operation. In aspects, each of the rail 140, the surgical cart 100, the instrument drive unit 80, or any other suitable component of the surgical robotic system 1 may include the magneto sensor 150.

In aspects, as shown in FIG. 3A, the magneto sensor 150 may be integrated onto a drive component 151 in a joint "J" interconnecting the adjacent elongate links 110, 120, 130. As shown in FIG. 3B, the magneto sensor 150 may be integrated internally onto a hollow shaft 153 in the joint "J" and/or integrated onto an output shaft or coupling 155 of a servo-drive motor 157.

Figure 4:
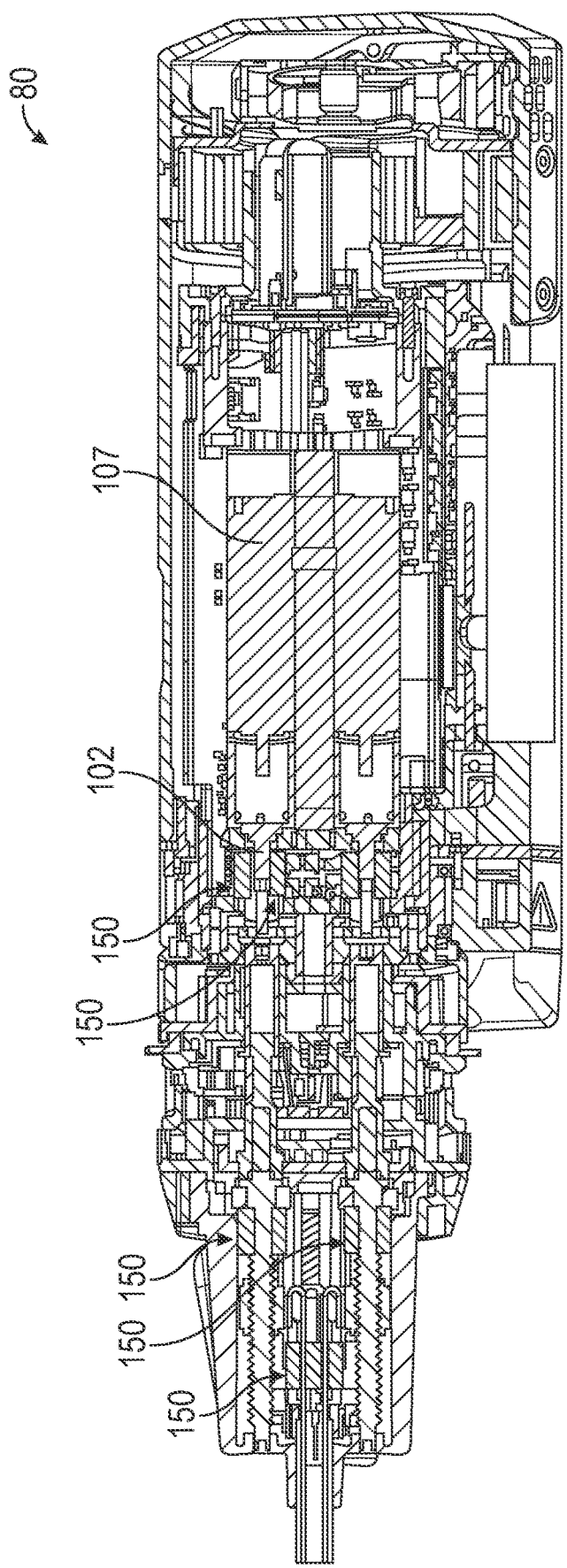
FIG. 4 is a longitudinal cross-sectional view illustrating the instrument drive unit of the surgical robotic system of FIG. 1.
Figure 5:
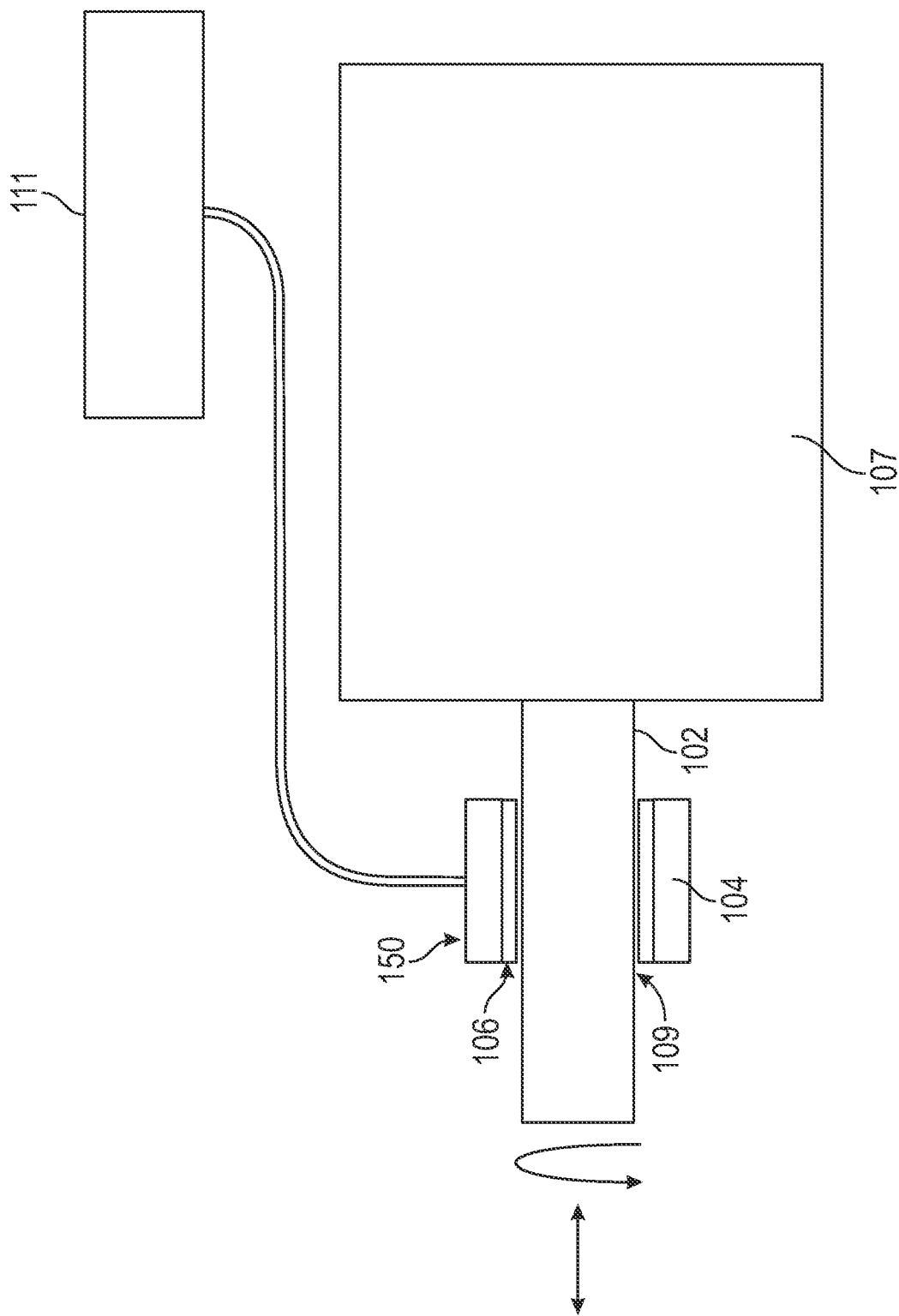
FIG. 5 is a schematic diagram illustrating components of the instrument drive unit of FIG. 4.

With reference to FIGS. 4 and 5, the magneto sensor 150 is a magnetoelastic sensor incorporated into the instrument drive unit 80 and associated with the drive shaft 102 of the instrument drive unit 80. The drive shaft 102, which is drivingly coupled to a motor 107, may be a magnetized metal shaft and the sensor 150 includes an annular cuff 104 disposed about and spaced from an outer surface of the drive shaft 102 such that the drive shaft 102 and sensor 150 are not contacting one another. The cuff or collar 104 of the sensor 102 includes a sensor coil 106 configured to detect minute changes in the magnetic field of the drive shaft 102 during rotation thereof due to the magnetoelastic effect.

The magneto sensor 150 may include an insulator 109 in the form of a thin sheet of high dielectric material disposed about the drive shaft 102. Some high dielectric materials for the insulator 109 include FEP, PVDF, TPI, PEEK, ECTFE, PVF, and PEI. In aspects, the insulator 109 may be fixed to the sensor coil 106 and spaced from an outer surface of the drive shaft 102 or fixed to the outer surface of the drive shaft 102 and spaced from the sensor coil 106 to define an air gap therebetween. By using a high dielectric material 109, an air gap can be maintained with a strong dielectric resistance.

The sensor coil 106 is configured to relay the sensed information to an amplification control circuit 111, which may wirelessly communicate the sensed information to a processor (e.g., control device 4). The control device 4 is configured to correlate the sensed change in the magnetic field of the drive shaft 102 with a corresponding torque of the drive shaft 102. The amplification control circuit 111 may be battery-powered or coupled to an external power source. In aspects, the drive shaft 102 may be configured to translate in response to an activation of the motor. The magneto sensor 150 may be configured to determine the axial force experienced by the drive shaft 102 during its translation.

In aspects, the drive shaft 102 or any other shaft of the surgical robotic system 1 under torsion and/or axial loading being monitored by the sensor 150 may be magnetized with any suitable ferromagnetic alloy combination. In aspects, the shaft may use at least one alloy or lamination of steel, aluminum, titanium, bronze, chromium, polymer, resin, or carbon fiber, which may also incorporate a magnetized ring made from at least one of ferromagnetic alloy, magnetically viable alloy, or magnetically viable materials. The shaft may incorporate a magnetically viable coating or a magnetically permeable coating.

Figure 6:
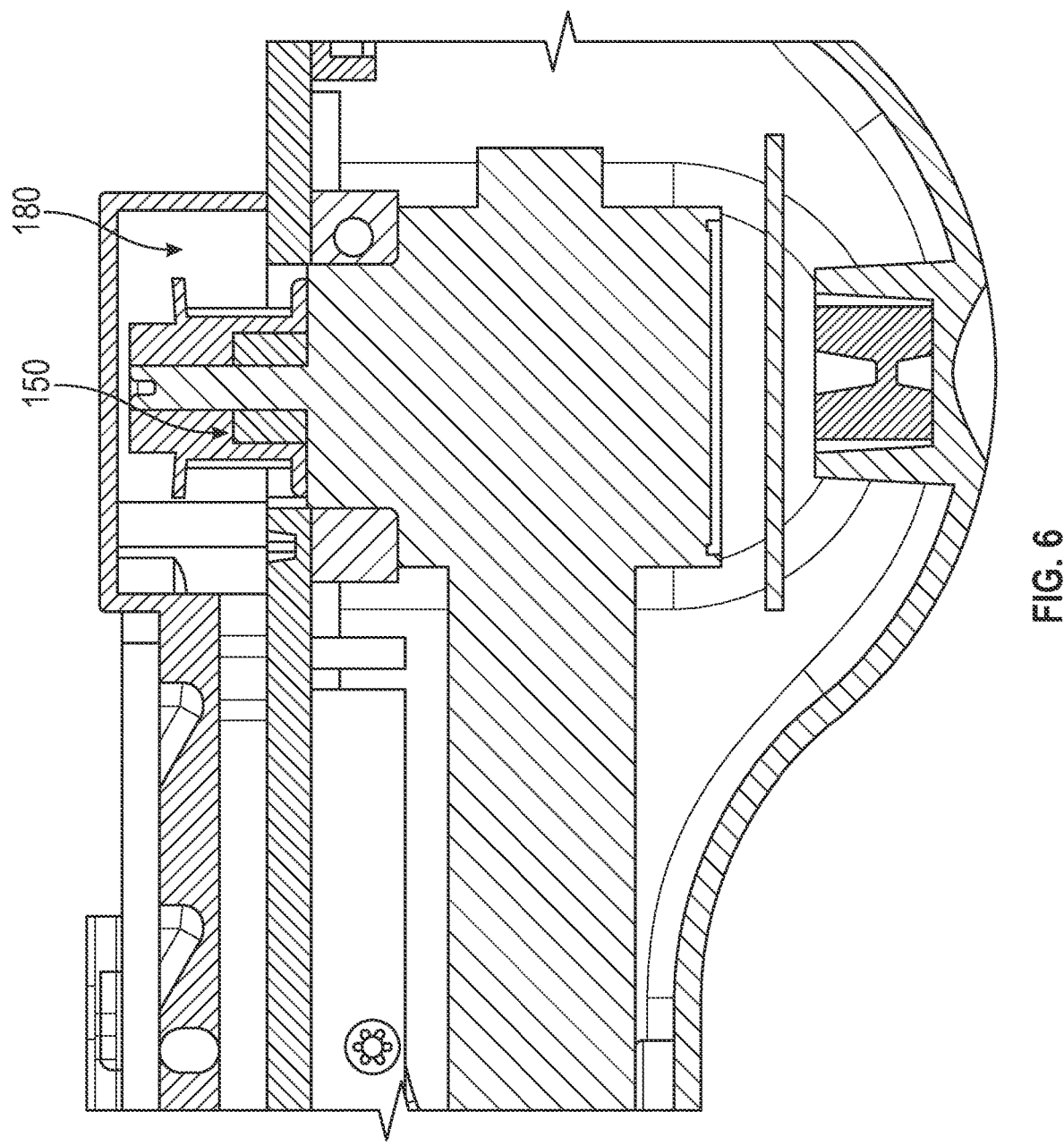
FIG. 6 is another cross-sectional view illustrating a joint of the robotic arm of FIG. 1.

With reference to FIG. 6, a magneto sensor 150 is a magnetoelastic sensor incorporated into a motor or transmission output to monitor and control pulley drives 180, gear drives, linear screw drives, or the like, and may acuate robotic arm joints, linear drive assemblies or surgical devices or manipulators.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. Amended) A surgical robotic system, comprising:
    an elongated rail having a proximal end portion, a distal end portion, and a track defined between the proximal and distal end portions; and
    an instrument drive unit configured for slidable engagement with the track of the rail, the instrument drive unit including:
        a motor;
        a drive shaft drivingly coupled to the motor and configured to move in response to an activation of the motor, wherein the drive shaft is magnetized;
        a magneto sensor including a coil disposed about the drive shaft and spaced radially from the drive shaft, wherein the drive shaft is rotatable relative to the magneto sensor, and wherein the magneto sensor is configured to determine a force experienced by the drive shaft; and
        an insulator disposed around the drive shaft and between an outer surface of the drive shaft and the magneto sensor.

2. The surgical robotic system according to claim 1, wherein the magneto sensor is selected from the group consisting of a magnetostrictive sensor, a magnetoelastic sensor, and a magnetoresistive sensor.

3. The surgical robotic system according to claim 1, wherein the magneto sensor is a magnetoelastic sensor.

4. The surgical robotic system according to claim 3, wherein the drive shaft is configured to rotate in response to the activation of the motor, and the force determined by the magneto sensor is a torque of the drive shaft.

5. The surgical robotic system according to claim 3, wherein the drive shaft is configured to translate in response to the activation of the motor, and the force determined by the magneto sensor is an axial force experienced by the drive shaft.

6. The surgical robotic system according to claim 3, wherein the insulator is a dielectric sheet.

7. The surgical robotic system according to claim 3, further comprising an amplification control circuit in communication with the magnetoelastic sensor.

8. The surgical robotic system according to claim 1, further comprising a surgical instrument including:
    a housing portion configured to detachably connect to the instrument drive unit;
    an elongate shaft extending distally from the housing portion; and
    an end effector coupled to a distal end portion of the elongate shaft, the drive shaft of the instrument drive unit being configured to drive an operation of the end effector.

9. An instrument drive unit for driving an operation of a surgical instrument, the instrument drive unit comprising:
a motor,
a drive shaft drivingly coupled to the motor and configured to move in response to an activation of the motor, wherein the drive shaft is magnetized;
a magneto sensor including a coil disposed about the drive shaft and spaced radially from the drive shaft, wherein the drive shaft is rotatable relative to the magneto sensor, and wherein the magneto sensor is configured to determine a force experienced by the drive shaft; and
an insulator disposed around the drive shaft and between an outer surface of the drive shaft and the magneto sensor.

10. The instrument drive unit according to claim 9, wherein the magneto sensor is selected from the group consisting of a magnetostrictive sensor, a magnetoelastic sensor, and a magnetoresistive sensor.

11. The instrument drive unit according to claim 9, wherein the magneto sensor is a magnetoelastic sensor.

12. The instrument drive unit according to claim 9, wherein the drive shaft is configured to rotate in response to the activation of the motor, and the force determined by the magneto sensor is a torque of the drive shaft.

13. The instrument drive unit according to claim 9, wherein the drive shaft is configured to translate in response to the activation of the motor, and the force determined by the magneto sensor is an axial force experienced by the drive shaft.

14. The instrument drive unit according to claim 9, wherein the insulator is a dielectric sheet.

* * * * *